United States Patent
Lu

(10) Patent No.: US 8,254,149 B2
(45) Date of Patent: Aug. 28, 2012

(54) POWER SUPPLY MODULE PROVIDING FEEDBACK VOLTAGE STABILIZATION TO ELIMINATE INDUCTOR SPIKE

(75) Inventor: Jian-Hui Lu, Shenzhen (CN)

(73) Assignees: Hong Fu Jin Precision Industry (ShenZhen) Co., Ltd., Shenzhen, Guangdong Province (TW); Hon Hai Precision Industry Co., Ltd., Tu-Cheng, New Taipei (TW)

(*) Notice: Subject to any disclaimer, the term of this patent is extended or adjusted under 35 U.S.C. 154(b) by 382 days.

(21) Appl. No.: 12/715,389

(22) Filed: Mar. 2, 2010

(65) Prior Publication Data

US 2010/0232185 A1  Sep. 16, 2010

(30) Foreign Application Priority Data

Mar. 11, 2009  (CN) .......................... 2009 1 0300799

(51) Int. Cl.
*H02M 3/335* (2006.01)
(52) U.S. Cl. ...................... 363/20; 363/21.04; 363/21.12
(58) Field of Classification Search ............... 363/21.02, 363/21.04, 21.06–21.09, 21.1, 21.12, 21.14–21.17; 323/901
See application file for complete search history.

(56) References Cited

U.S. PATENT DOCUMENTS

| | | | | |
|---|---|---|---|---|
| 6,724,642 B2* | 4/2004 | Brkovic | ..................... | 363/21.08 |
| 7,262,559 B2 | 8/2007 | Tripathi et al. | | |
| 7,468,896 B2* | 12/2008 | Gong et al. | ................ | 363/21.17 |
| 8,031,494 B2* | 10/2011 | Brkovic | ......................... | 363/49 |
| 2004/0032754 A1* | 2/2004 | Yang | ............................ | 363/56.09 |
| 2004/0037098 A1* | 2/2004 | Konno | ............................ | 363/49 |

FOREIGN PATENT DOCUMENTS

| CN | 200947531 Y | 9/2007 |
|---|---|---|
| CN | 201243257 Y | 5/2009 |

* cited by examiner

*Primary Examiner* — Adolf Berhane
*Assistant Examiner* — Emily Pham
(74) *Attorney, Agent, or Firm* — Altis Law Group, Inc.

(57) ABSTRACT

A power supply module includes an AC/DC converter, a voltage transforming circuit, a feedback circuit, and a detecting circuit. The AC/DC converter is used for converting the input AC voltage to a primary DC voltage. The voltage transforming circuit is used for transforming the primary DC voltage to the first DC voltage. The feedback circuit is used for sampling the first DC voltage to generate a feedback signal. The detecting circuit is used for detecting if the power supply module is powered on, and generating a first voltage when detecting that the power supply module is powered on. Wherein the voltage transforming circuit maintains the first DC voltage at a first predetermined value according to the feedback signal, the feedback circuit increases a magnitude of the feedback signal according to the first voltage.

18 Claims, 2 Drawing Sheets

POWER SUPPLY MODULE PROVIDING FEEDBACK VOLTAGE STABILIZATION TO ELIMINATE INDUCTOR SPIKE

BACKGROUND

1. Technical Field

The disclosed embodiments relate to power supply modules, and more particularly to a power supply module with a feedback circuit.

2. Description of Related Art

Electronic devices powered by a power supply module correspond to various rated voltages. The power supply module receives and processes an input alternating current (AC) voltage from an external power source, and generates a first direct current (DC) voltage to power the electronic device.

Generally, the power supply module includes an AC/DC converter, a voltage transforming circuit, an inductor, and a feedback circuit. The AC/DC converter is used for converting the input AC voltage to a primary DC voltage. The voltage transforming circuit is used for transforming the primary DC voltage to the first DC voltage. The feedback circuit is used for generating a feedback signal according to the first DC voltage. The voltage transforming circuit adjusts the first DC voltage according to the feedback signal, so as to maintain the first DC voltage to a first predetermined value.

However, the voltage transforming circuit is coupled to the electronic device via the inductor, one end of the feedback circuit is coupled between the inductor and the electronic device. When the power supply module is powered on, the first DC voltage is usually larger, and a current flowing through the inductor spikes. Accordingly, the first DC voltage is likely to be above the first predetermined value and may damage the electronic device.

What is needed, therefore, is a power supply module for overcoming the above described limitation.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
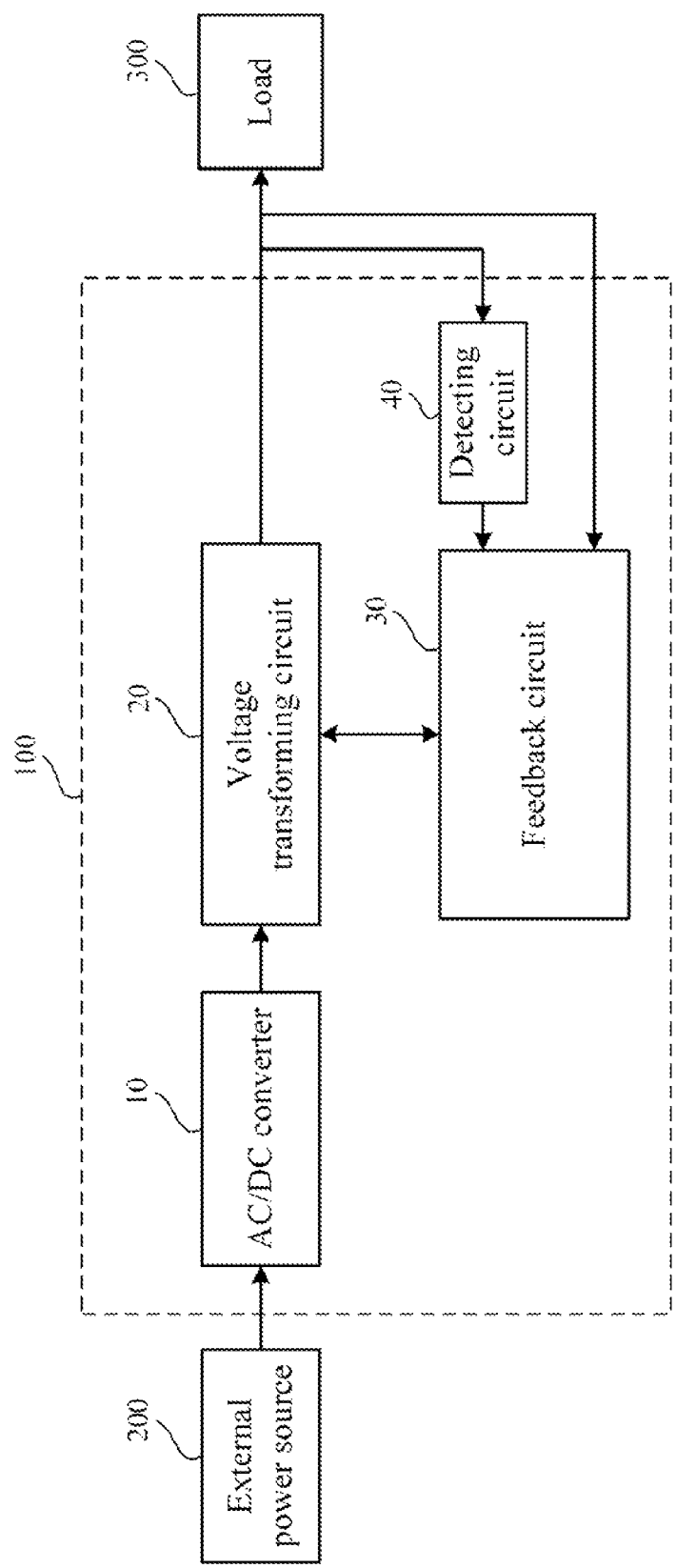
FIG. 1 is a block diagram of a power supply module in accordance with an exemplary embodiment.

Referring to FIG. 1, a power supply module 100 in accordance with an exemplary embodiment is illustrated. The power supply module 100 is used for converting an input alternating current (AC) voltage from an external power source 200 to a first direct current (DC) voltage, and applying the first DC voltage to a load 300. The power supply module 100 includes an AC/DC converter 10, a voltage transforming circuit 20, a feedback circuit 30, and a detecting circuit 40.

The AC/DC converter 10 is coupled to the external power source 200. The AC/DC converter 10 is used for converting the input AC voltage to a primary DC voltage, and providing the primary DC voltage to the voltage transforming circuit 20.

The voltage transforming circuit 20 is coupled to the AC/DC converter 10. The voltage transforming circuit 20 is used for transforming the primary DC voltage to the first DC voltage and a second DC voltage. The first DC voltage is used to power the load 300. The second DC voltage is used to power the feedback circuit 30. In detail, the voltage transforming circuit 20 includes a transformer T1, a rectifying-filtering circuit 22, and an inductor L1. The transformer T1 is coupled to the AC/DC converter 10, the rectifying-filtering circuit 22 is coupled to the transformer T1, and the inductor L1 is coupled between the rectifying-filtering circuit 22 and the load 300.

The feedback circuit 30 is used for sampling the first DC voltage to generate a first voltage and a second voltage. A feedback voltage is defined by subtracting the second voltage from the first voltage. The feedback circuit 30 is further used for generating a feedback signal according to the feedback voltage. The voltage transforming circuit 20 maintains the first DC voltage at a first predetermined value according to the feedback signal.

The detecting circuit 40 is coupled to the feedback circuit 30. The detecting circuit 40 is used for detecting whether the power supply module 100 is powered on, and generating a third voltage when detecting that the power supply module 100 is powered on. A difference voltage is defined by subtracting the third voltage from the second voltage. When the difference voltage reaches a second predetermined value, the second voltage is reduced, and the feedback voltage is increased. The feedback circuit 30 increases the magnitude of the feedback signal according to the increased feedback voltage. Therefore, when the power supply module 100 is powered on, the voltage transforming circuit 20 still can maintain the first DC voltage at the first predetermined value according to the increased feedback signal.

Figure 2:
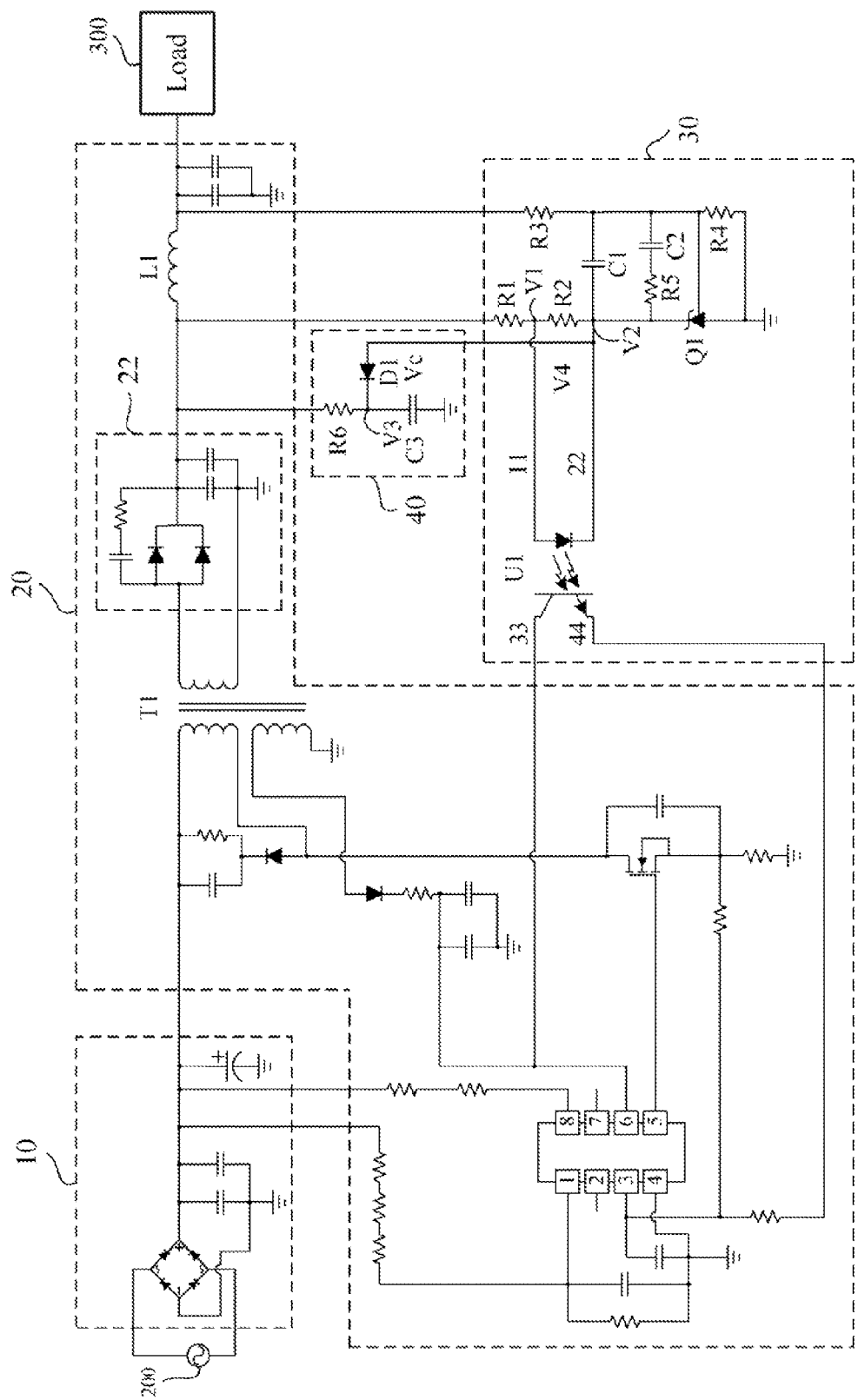
FIG. 2 is a circuit diagram of the power supply module of FIG. 1 in accordance with an exemplary embodiment.

Referring to FIG. 2, the feedback circuit 30 includes a first resistor R1, a second resistor R2, a third resistor R3, a fourth resistor R4, a fifth resistor R5, a first capacitor C1, a second capacitor C2, an optocoupler U1, and a triode for alternating current (TRIAC) Q1. The optocoupler U1 includes a first input terminal 11, a second input terminal 22, a third input terminal 33, and an output terminal 44.

The first resistor R1 and the second resistor R2 are coupled in series between the voltage transforming circuit 20 and a cathode of the TRIAC Q1. The third resistor R3 and the fourth resistor R4 are coupled in series between the voltage transforming circuit 20 and ground. An anode of the TRIAC Q1 is grounded, a gate of the TRIAC Q1 is coupled between the third resistor R3 and the fourth resistor R4. The first input terminal 11 is coupled between the first resistor R1 and the second resistor R2. The second input terminal 22 is coupled between the second resistor R2 and the cathode of the TRIAC Q1. The third input terminal 33 and the output terminal 44 are coupled to the voltage transforming circuit 20. One end of the first capacitor C1 is coupled to the second input terminal 22, the other end of the first capacitor C1 is coupled between the third resistor R3 and the fourth resistor R4. The fifth resistor R5 and the second capacitor C2 are coupled between the cathode of the TRIAC Q1 and the gate of the TRIAC Q1.

The detecting circuit 40 includes a diode D1, a sixth resistor R6, and a third capacitor C3. A capacitance of the third capacitor C3 is very large. One end of the sixth resistor R6 is coupled between the rectifying-filtering circuit 22 and the inductor L1, the other end of the sixth resistor R6 is grounded through the third capacitor C3. An anode of the diode D1 is coupled to the second input terminal 22, a cathode of the diode D1 is coupled between the sixth resistor R6 and the third capacitor C3.

The principal of the power supply module 100 is described as follows. When the power supply module 100 is powered on, the first DC voltage charges up the third capacitor C3 through the sixth resistor R6, thus the third voltage V3 across the third capacitor C3 is increased from zero volts. Because the capacitance of the third capacitor C3 is very large, the third voltage V3 increases slowly.

The third resistor R3 and the fourth resistor R4 divides the first DC voltage to generate a fourth voltage. The fourth voltage is a voltage across the fourth resistor R4. The fourth voltage turns on the TRIAC Q1, then the first voltage V1 and the second voltage V2 are generated. The first voltage V1 is the voltage of the first input terminal 11 of the optocoupler U1. The second voltage V2 is the voltage of the second input terminal 22 of the optocoupler U1. The feedback voltage V4 is the voltage across the second resistor R2. The feedback voltage V4 is defined by subtracting the second voltage from the first voltage, the difference voltage is defined by subtracting the third voltage from the second voltage. Because the third voltage V3 is increased slowly, therefore the difference voltage reaches a bias voltage of the diode D1, the diode D1 is turned on. The second voltage V2 is reduced, and the feedback voltage V4 is increased.

Because the feedback voltage V4 is increased, thus the magnitude of the feedback signal is increased, and the voltage transforming circuit 20 can maintain the first DC voltage at the first predetermined value according to the increased feedback signal.

A charge time τ of the third capacitor C3 is calculated by the following formula:

$$\tau = R6 * C3$$

After the charge time τ, the third voltage V3 is equal to the first DC voltage. The second voltage V2 is smaller than the third voltage V3. Because the difference voltage is defined by subtracting the third voltage from the second voltage, the difference voltage is smaller than the bias voltage of the diode D1, the diode D1 is turned off. Therefore, the second voltage V2 becomes stable, and the feedback voltage V4 becomes stable, the power supply module 100 is working normally.

Alternative embodiments will become apparent to those skilled in the art to which the present invention pertains without departing from the spirit and scope. Accordingly, the present invention should be deemed not to be limited to the above detailed description, but rather by the claims that follow.

What is claimed is:

1. A power supply module configured for converting an input alternating current (AC) voltage to a first direct current (DC) voltage and applying the first DC voltage to a load, the power supply module comprising:
    an AC/DC converter for converting the input AC voltage to a primary DC voltage;
    a voltage transforming circuit for transforming the primary DC voltage to the first DC voltage;
    a feedback circuit for sampling the first DC voltage to generate a first voltage and a second voltage, a feedback voltage being defined by subtracting the second voltage from the first voltage, the feedback circuit further generating a feedback signal according to the feedback voltage; and
    a detecting circuit for generating a third voltage according to the first DC voltage;
    wherein a difference voltage is defined by subtracting the third voltage from the second voltage, when the difference voltage reaches a second predetermined value, the second voltage is reduced, the feedback voltage is increased, the feedback circuit increases a magnitude of the feedback signal according to the increased feedback voltage, the voltage transforming circuit maintains the first DC voltage at a first predetermined value according to the feedback signal.

2. The power supply module of claim 1, wherein the detecting circuit is used for detecting if the power supply module is powered on, and generating the third voltage when detecting that the power supply module is powered on.

3. The power supply module of claim 1, wherein the voltage transforming circuit transforms the primary DC voltage to a second DC voltage, the feedback circuit comprises an optocoupler, the optocoupler comprises a first input terminal, a second input terminal, a third input terminal, and an output terminal, the second voltage is applied to the first input terminal, the third voltage is applied to the second input terminal, the second DC voltage is applied to the third input terminal, the output terminal is coupled to the voltage transforming circuit.

4. The power supply module of claim 3, wherein the feedback circuit further comprises a first resistor, a second resistor, a third resistor, a fourth resistor, and a triode for alternating current (TRIAC), the first resistor and the second resistor are coupled in series between the voltage transforming circuit and a cathode of the TRIAC, an anode of the TRIAC is grounded, the third resistor and the fourth resistor are coupled in series between the voltage transforming circuit and ground, a gate of the TRIAC is coupled between the third resistor and the fourth resistor, the first input terminal is coupled between the first resistor and the second resistor, the second input terminal is coupled between the second resistor and the cathode of the TRIAC.

5. The power supply module of claim 4, wherein the feedback circuit further comprises a first capacitor, one end of the first capacitor is coupled to the second input terminal, the other end of the first capacitor is coupled between the third resistor and the fourth resistor.

6. The power supply module of claim 4, wherein the feedback circuit further comprises a second capacitor and a fifth resistor, the fifth resistor and the second capacitor are coupled between the cathode of the TRIAC and the gate of the TRIAC.

7. The power supply module of claim 2, wherein the detecting circuit comprises a third capacitor, a sixth resistor, and a diode, the sixth resistor and the third capacitor are coupled in series between the voltage transforming circuit and ground, an anode of the diode is coupled to the feedback circuit, a cathode of the diode is coupled between the sixth resistor and the third capacitor, wherein the first predetermined value is a bias voltage of the diode.

8. A power supply module configured for converting an input alternating current (AC) voltage to a first direct current (DC) voltage and applying the first DC voltage to a load, the power supply module comprising:
    an AC/DC converter for converting the input AC voltage to a primary DC voltage;
    a voltage transforming circuit for transforming the primary DC voltage to the first DC voltage;
    a feedback circuit for sampling the first DC voltage to generate a feedback signal; and
    a detecting circuit for detecting if the power supply module is powered on, and generating a first voltage when detecting that the power supply module is powered on;
    wherein the feedback circuit increases a magnitude of the feedback signal according to the first voltage, and the voltage transforming circuit maintains the first DC voltage at a first predetermined value according to the feedback signal.

9. The power supply module of claim 8, wherein the feedback circuit is used for sampling the first DC voltage to generate a second voltage and a third voltage, a feedback voltage is defined by subtracting the third voltage from the second voltage, a difference voltage is defined by subtracting the third voltage from the first voltage, when the difference voltage reaches a second predetermined value, the third voltage is reduced, the feedback voltage is increased, the feedback circuit increases the magnitude of the feedback signal according to the increased feedback voltage.

10. The power supply module of claim 9, wherein the voltage transforming circuit transforms the primary DC voltage to a second DC voltage, the feedback circuit comprises an optocoupler, the optocoupler comprises a first input terminal, a second input terminal, a third input terminal, and an output terminal, the second voltage is applied to the first input terminal, the third voltage is applied to the second input terminal, the second DC voltage is applied to the third input terminal, the output terminal is coupled to the voltage transforming circuit.

11. The power supply module of claim 10, wherein the feedback circuit further comprises a first resistor, a second resistor, a third resistor, a fourth resistor, and a triode for alternating current (TRIAC), the first resistor and the second resistor are coupled in series between the voltage transforming circuit and a cathode of the TRIAC, an anode of the TRIAC is grounded, the third resistor and the fourth resistor are coupled in series between the voltage transforming circuit and ground, a gate of the TRIAC is coupled between the third resistor and the fourth resistor, the first input terminal is coupled between the first resistor and the second resistor, the second input terminal is coupled between the second resistor and the cathode of the TRIAC.

12. The power supply module of claim 11, wherein the feedback circuit further comprises a first capacitor, one end of the first capacitor is coupled to the second input terminal, the other end of the first capacitor is coupled between the third resistor and the fourth resistor.

13. The power supply module of claim 11, wherein the feedback circuit further comprises a second capacitor and a fifth resistor, the fifth resistor and the second capacitor are coupled between the cathode of the TRIAC and the gate of the TRIAC.

14. The power supply module of claim 8, wherein the detecting circuit comprises a third capacitor, a sixth resistor and a diode, the sixth resistor and the third capacitor are coupled in series between the voltage transforming circuit and ground, an anode of the diode is coupled to the feedback circuit, a cathode of the diode is coupled between the sixth resistor and the third capacitor, wherein the first predetermined value is a bias voltage of the diode.

15. A power supply module configured for converting an input alternating current (AC) voltage to a first direct current (DC) voltage and applying the first DC voltage to a load, the power supply module comprising:
an AC/DC converter for converting the input AC voltage to a primary DC voltage;
a voltage transforming circuit for transforming the primary DC voltage to the first DC voltage;
a feedback circuit for sampling the first DC voltage to generate a feedback signal; and
a detecting circuit for detecting if the power supply module is powered on, and generating a first voltage when detecting that the power supply module is powered on;
wherein the voltage transforming circuit comprises a transformer coupled to the AC/DC converter, a rectifying-filtering circuit coupled to the transformer, and an inductor coupled between the rectifying-filtering circuit and the load, the detecting circuit comprises a terminal coupled between the rectifying-filtering circuit and the inductor; the feedback circuit increases a magnitude of the feedback signal according to the first voltage, the voltage transforming circuit maintains the first DC voltage at a first predetermined value according to the feedback signal.

16. The power supply module of claim 15, wherein the detecting circuit comprises a third capacitor, a sixth resistor and a diode, one end of the sixth resistor is coupled between the rectifying-filtering circuit and the inductor, the other end of the sixth resistor is grounded through the third capacitor, an anode of the diode is coupled to the feedback circuit, a cathode of the diode is coupled between the sixth resistor and the third capacitor, wherein the first predetermined value is a bias voltage of the diode.

17. The power supply module of claim 15, wherein the feedback circuit is used for sampling the first DC voltage to generate a second voltage and a third voltage, a feedback voltage is defined by subtracting the third voltage from the second voltage, a difference voltage is defined by subtracting the third voltage from the first voltage, when the difference voltage reaches a second predetermined value, the third voltage is reduced, the feedback voltage is increased, the feedback circuit increases the magnitude of the feedback signal according to the increased feedback voltage.

18. The power supply module of claim 17, wherein the voltage transforming circuit transforms the primary DC voltage to a second DC voltage, the feedback circuit comprises an optocoupler, the optocoupler comprises a first input terminal, a second input terminal, a third input terminal, and an output terminal, the second voltage is applied to the first input terminal, the third voltage is applied to the second input terminal, the second DC voltage is applied to the third input terminal, the output terminal is coupled to the voltage transforming circuit.

* * * * *

UNITED STATES PATENT AND TRADEMARK OFFICE
CERTIFICATE OF CORRECTION

PATENT NO. : 8,254,149 B2  
APPLICATION NO. : 12/715389  
DATED : August 28, 2012  
INVENTOR(S) : Jian-Hui Lu Page 1 of 1

It is certified that error appears in the above-identified patent and that said Letters Patent is hereby corrected as shown below:

On the Title Page please replace Item (73) regarding "Assignees" with the following:

Item (73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW).

Signed and Sealed this  
Seventh Day of January, 2014

Margaret A. Focarino  
*Commissioner for Patents of the United States Patent and Trademark Office*